(12) United States Patent
Tsivicos

(10) Patent No.: US 9,325,221 B2
(45) Date of Patent: Apr. 26, 2016

(54) APPARATUS AND METHOD FOR EFFICIENTLY GENERATING POWER WHEN A DOOR IS ACTED UPON BY AN OUTSIDE FORCE

(71) Applicant: Haralambos S. Tsivicos, Wayside, NJ (US)

(72) Inventor: Haralambos S. Tsivicos, Wayside, NJ (US)

(*) Notice: Subject to any disclaimer, the term of this patent is extended or adjusted under 35 U.S.C. 154(b) by 0 days.

(21) Appl. No.: 14/673,699

(22) Filed: Mar. 30, 2015

(65) Prior Publication Data

US 2015/0236568 A1    Aug. 20, 2015

Related U.S. Application Data

(63) Continuation of application No. 13/328,324, filed on Dec. 16, 2011, now Pat. No. 8,994,198.

(60) Provisional application No. 61/423,859, filed on Dec. 16, 2010.

(51) Int. Cl.
| F02B 63/04 | (2006.01) |
| F03G 7/08 | (2006.01) |
| H02K 7/18 | (2006.01) |
| F03G 5/06 | (2006.01) |
| F03B 13/10 | (2006.01) |
| H02P 9/04 | (2006.01) |

(52) U.S. Cl.
CPC ............... *H02K 7/1853* (2013.01); *F03G 5/06* (2013.01); *F03G 7/08* (2013.01)

(58) Field of Classification Search
USPC ............................................. 290/1 R, 42, 53
See application file for complete search history.

(56) References Cited

U.S. PATENT DOCUMENTS

| 4,124,182 | A | 11/1978 | Loeb |
| 4,145,885 | A | 3/1979 | Solell |
| 4,228,360 | A | 10/1980 | Navarro |
| 4,366,595 | A | 1/1983 | Elliott |
| 4,718,232 | A * | 1/1988 | Willmouth ............... F03B 17/04 290/1 R |
| 5,359,229 | A | 10/1994 | Youngblood |
| 6,236,118 | B1 | 5/2001 | Vasija et al. |
| 6,236,152 | B1 | 5/2001 | Kimiya et al. |
| 7,045,912 | B2 | 5/2006 | Leijon et al. |
| 7,319,278 | B2 | 1/2008 | Gehring |
| 7,522,042 | B2 | 4/2009 | Milo |
| 7,608,933 | B2 | 10/2009 | Yang |
| 7,735,319 | B2 | 6/2010 | Vukovic |
| 7,795,746 | B2 | 9/2010 | Riley et al. |
| 8,287,434 | B2 | 10/2012 | Zavadsky et al. |
| 8,446,034 | B1 | 5/2013 | Stevens |
| 8,901,766 | B2 | 12/2014 | Werjefelt |
| 8,994,198 | B2 * | 3/2015 | Tsivicos ............... H02K 7/1853 290/1 R |
| 2003/0102752 | A1 | 6/2003 | Mathisen |
| 2003/0110767 | A1 | 6/2003 | Lee |

(Continued)

FOREIGN PATENT DOCUMENTS

| CN | 201173170 Y | 12/2008 |
| CN | 201924760 U | 8/2011 |

(Continued)

*Primary Examiner* — Pedro J Cuevas
(74) *Attorney, Agent, or Firm* — Patterson & Sheridan, LLP

(57) ABSTRACT

A system for generating electricity from the motion of a door is provided. In one embodiment, the system includes an AC or a DC generator acted upon by a flexible member coupled to at or near an edge of a door opposite a hinge. The sweep of the door causes the flexible member to impart rotary motion to the generator, thereby generating electricity.

17 Claims, 4 Drawing Sheets

(56) References Cited

U.S. PATENT DOCUMENTS

| | | |
|---|---|---|
| 2006/0028026 A1 | 2/2006 | Yim |
| 2006/0273594 A1 | 12/2006 | Gehring |
| 2007/0268132 A1* | 11/2007 | Milo .................. E05B 47/02 340/545.1 |
| 2008/0047200 A1 | 2/2008 | Krause et al. |
| 2008/0157536 A1 | 7/2008 | Bulthaup et al. |
| 2008/0295510 A1 | 12/2008 | Vukovic |
| 2009/0036276 A1 | 2/2009 | Loach |
| 2009/0322092 A1 | 12/2009 | Werjefelt |
| 2010/0064679 A1 | 3/2010 | Straume |
| 2010/0102562 A1* | 4/2010 | Greenspan .......... F03B 13/1865 290/53 |
| 2011/0031750 A1 | 2/2011 | Kreissig |
| 2011/0251021 A1 | 10/2011 | Zavadsky et al. |
| 2011/0257797 A1 | 10/2011 | Burris et al. |

FOREIGN PATENT DOCUMENTS

| | | |
|---|---|---|
| JP | 2004204533 A | 7/2004 |
| WO | 2011117083 A1 | 9/2011 |

* cited by examiner

US 9,325,221 B2

APPARATUS AND METHOD FOR EFFICIENTLY GENERATING POWER WHEN A DOOR IS ACTED UPON BY AN OUTSIDE FORCE

CROSS-REFERENCE TO RELATED APPLICATIONS

This application is a continuation of U.S. patent application Ser. No. 12/328,324, filed Dec. 16, 2011, which claims benefit of U.S. Provisional Patent Application Ser. No. 61/423,859, filed Dec. 16, 2010, both of which are incorporated by reference in their entireties.

BACKGROUND

1. Field of the Invention

The present invention relates to the apparatus and method related to generating electricity and directing it to applications within or outside of a given structure via harnessing the energy imparted on a doorway when it is acted upon by an outside force.

2. Description of the Related Art

Due to the ever increasing global reliance on fossil fuels and non-renewable resources, there is a growing need to develop renewable energy technologies. Throughout the world there are a number of structures that experience an extremely high value of foot traffic through their entranceways on a daily basis. Every time a door is opened by an outside force acts on the doorway. Energy is imparted to a door when it is opened, but this energy is either wasted, or captured in an inefficient or unfeasible manner. There exists great potential to generate vast amounts of electricity if a highly efficient system is developed to capture the kinetic energy of an opening door and generate electricity from it. Generated electricity can either be stored in batteries or routed directly to a host of applications either inside or outside of a given structure. Applications include passive heating and cooling, security screening equipment, mobile device charging stations, alarm and fire systems, vending machines, and any and all applications within or outside of a building. Present methods of supplementing traditional electricity sources include solar panels. Unfortunately the efficiency and yield of solar panels is restricted by weather and lighting conditions. A system that generates electricity from the action of doors could generate vast amounts of electricity in a highly predictable, less constrained, more efficient manner.

Electrical generators such as those disclosed in U.S. Pat. Nos. 6,236,152 and 7,795,746 involve either bulky and inefficient designs that do not maximize the generated electricity. Both designs do not generate a maximum of electricity because the sweep of the door at the hinge side is much less then at the side opposite the hinges. The more sweep that is captured, the more revolutions in the generator that translates to, the more generated electricity. Also, integration into a doorway of both generators is extremely complex as the devices are not modular, and involve extensive retrofitting or installation into the doorway itself.

Thus, there is a needed for an improved energy generator that may be interfaced with a doorway.

SUMMARY

A system for generating electricity from the motion of a door is provided. In one embodiment, the system includes an AC or a DC generator acted upon by a flexible member coupled to at or near an edge of a door opposite a hinge. The sweep of the door causes the flexible member to impart rotary motion to the generator, thereby generating electricity.

In one embodiment, an energy generating system is provided that includes a flexible member, a generator and an engagement device. The flexible member has a first end fixable to a door. The engagement device is coupled to the generator and interfaced with the flexible member. The engagement device is operable to provide an input rotation to the generator when the flexible member is pulled in a first direction.

In one embodiment, an energy generating system is provided that includes a door coupled at a first edge to a structure by a hinge, a flexible member having a first end coupled to a door, a generator, and an engagement device coupled to the generator. The flexible member has a first end coupled adjacent a second edge of the door. The engagement device is interfaced with the flexible member and operable to provide an input rotation to the generator when the flexible member is pulled in a first direction.

In another embodiment, an energy generating system is provided that includes a flexible member, a generator, and an engagement device housed in a casing. The flexible member extends through an aperture formed through the casing and has a first end fixable to a door. The engagement device is coupled to the generator and interfaced with the flexible member. The engagement device is operable to provide an input rotation to the generator when the flexible member is pulled in a first direction.

In yet another embodiment, a method for generating energy is provide that includes opening a hinged door to cause a flexible member coupled between the door and a generator to move in a first direction, and causing an input rotation to the generator by movement of the flexible member in the first direction, the input rotation causing electricity to be generated by the generator.

BRIEF DESCRIPTION OF THE DRAWINGS

The aforementioned and other features of this invention, as well as the manner of attaining them, will be illustrated more clearly by examination of the associated drawings. The invention itself, as well as its clear improvements and advantages of all prior art will be made clear by careful examination of the illustrations.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
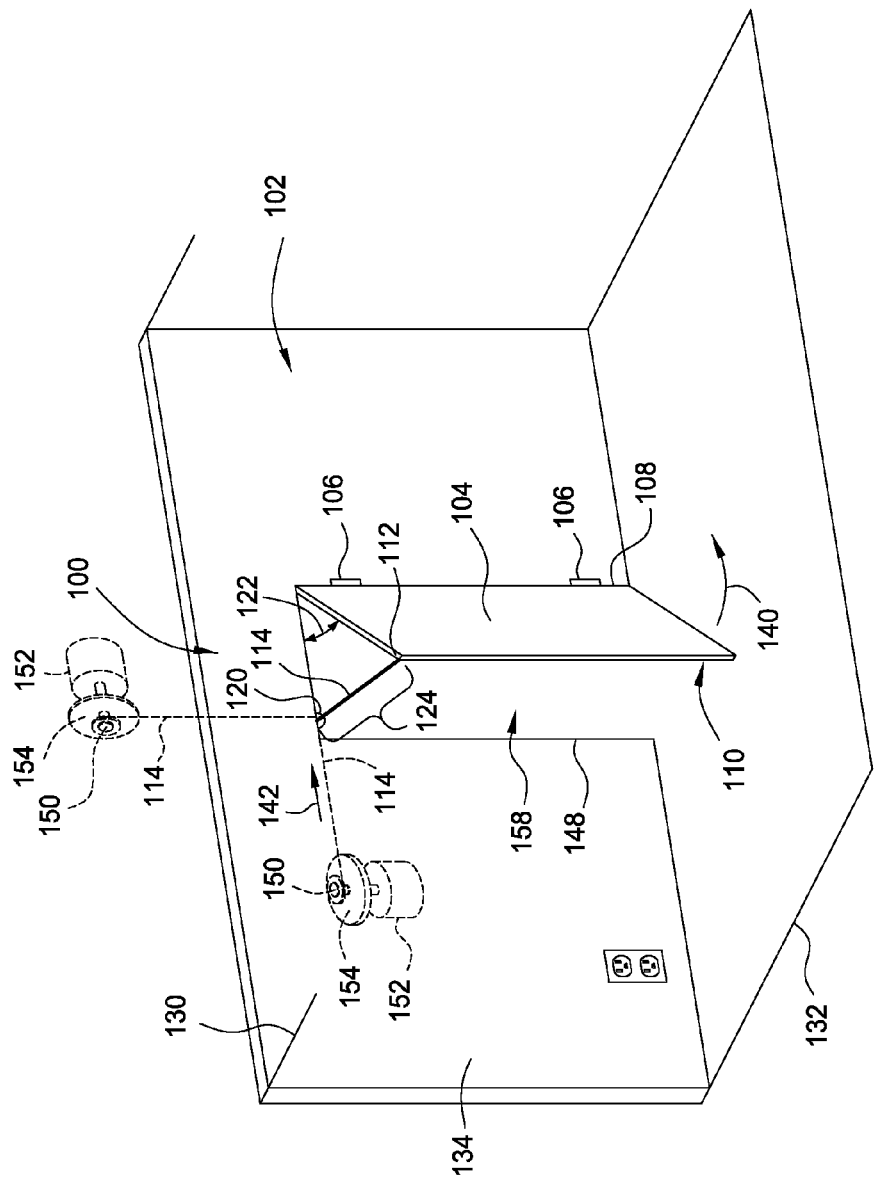
FIG. 1 is a perspective view of an entranceway or door assembly with one embodiment of an electricity generation system mounted to the doorway.

The present invention supersedes the prior art in efficiency, functionality, applicability, and yield by applying a system for generating electricity having a modular design that includes a flexible member that connects to a door at or near the point of greatest sweep as the door is opened. The present invention thus captures the greatest amount of motion and converts that motion into revolutions of a generator, thus generating electricity. The advantage of the present invention is also that the generator retains momentum even after action upon the door has ceased, this means that even once a door is closed, the generator is still free to continue spinning, and thus generating electricity. One embodiment of the present design does not required any significant modifications to an existing doorway, it is not necessary to integrate it into the hinges of the doorway, or, in some embodiments, into the wall of the doorway. The system can be added to any entranceway that involves a door opening and closing on hinges with no significant modifications to the doorway as the system can be simply mounted in a short amount of time, and then the generated electricity can be integrated into the building structure.

It is clearly beneficial to have a more efficient, easier to install, higher yield system for harnessing the vast amounts of energy dissipated by humans when interacting with doorways.

In one embodiment, the present invention provides either an AC or a DC generator including a flywheel type electricity generation device acted upon by a flexible member. The system is installed on any entranceway including a door mounted on hinges either with or without a frame. The system is specifically engaged with the side of the door opposite the hinges, for the explicit purpose of maximizing the amount of kinetic energy captured when the doorway is acted upon. When considering a doorway that is opened such as the one in FIG. 2, a sweep analysis reveals the true advantages of mounting the generator in this inventive way. The angle at the hinge side is equal to the angle at the side opposite the hinge. Due to the relationship between arc length, radius, and angle, it is clear that the arc length represented by the sweep of the door is much greater at the side opposite the hinges then at the hinges. This greater sweep results in a significantly higher yield on the part of the generator due to the increased revolutions, the higher angular velocity developed by the generator, as well as the angle of action between the flexible member and the doorway. This positioning serves to maximize the generated electricity in a way that is impossible via the application of prior art.

In one embodiment, the generation system includes a modular flywheel type electricity generator for mounting on a frame, wall, entranceway, door frame or other structure. A flexible member connects the door to the generator via a flexible member connected on the door at or near the point of greatest sweep. As a result, action upon the door results in rotation in the flywheel generator via the pulling of the flexible member from its housing in the generator. As the flexible member is pulled through the sweep of the door, the generator mechanism is rotated at a fairly high angular velocity. As the door closes, the flexible member retracts back into the generator, but does not affect the existing motion developed in the flywheel. The generator mechanism continues to retain momentum even after the action has ceased, and thus it continues to generate electricity. As a result, multiple openings in quick succession will only serve to continue to transfer additional momentum to the generator device.

In one embodiment the generator is a pancake-type generator which is housed in a casing. The casing is adapted to mount to a door frame and includes an engagement device configured with a spring loaded or other retraction mechanism to store a flexible member interfacing the generator with the door. In one embodiment, the casing includes a cut-out along its length so that the casing may be installed flush with a door frame despite the presence of a raised doorstop component of the door frame.

One advantage over the prior art is the ease of installation, and the modular design of the generator.

Another advantage is that the door does not need to be removed to install some embodiments of the system, and no alterations need to be made to the doorway, or wall.

This invention is advantaged over prior art due to its improved efficiency, and it ability to capture more of the kinetic energy imparted to a door upon action.

Yet another advantage is that embodiment of this system have the ability to continue generating electricity even after the action has ceased.

This energy generating system has the ability to power devices other then just low current devices. Due to the high angular velocities developed in the generator, higher current electricity can be generated, thus the range of potential applications increases dramatically.

Another advantage of some embodiments is the application of a flexible member coupled with a fairlead or pulley to guide the member through the sweep of the door. A rigid member in a similar application would result in energy losses due to the inability of the member to flex to the sweep of the door. The flexible member experiences minor losses while traversing the sweep, and always maintains an optimal angle of action between the member and the door. This also serves to maximize electrical generation.

Yet another advantage of some embodiments is that this system is not connected to a shaft and gear box by which a generator is rotated. As a result, the generator is free to move at much higher angular velocities, and it is not restricted by the motion of the gear box. This system has the ability to move through a much wider range of motion, and thus capture significantly more of the kinetic energy imparted on the doorway then prior systems. Also, the motion of the generator itself is not constrained by the motion of the door due to the integration of a retraction mechanism into the engagement device for the flexible member.

FIG. 1 is a perspective view of one embodiment of an electricity generating system 100 is interfaced with a door 104 mounted to a doorway 158 formed in a structure 102, such as a wall 134, or door frame. The door 104 includes a first side 108 coupled by hinges 106 to the structure 102 and a second side 110 located opposite the first side 108. The displacement of the door 104 about the hinges 106 defines the sweep of the door 104. The point of smallest sweep 122 is shown proximate the first side 108 of the door 104, as well as the point of greatest sweep 124 proximate the second side 110 of the door 104. In one embodiment, the invention takes advantage of the point of greatest sweep 124 for providing input for the energy generating system 100, serving as one of the points of novelty of the application of this system. The electricity generating system 100 includes a flexible member 114 and a generator 152 (shown in phantom). The generator 152 may be mounted on top of, below, to, or within the structure 102 (i.e., the wall 134, floor 132, or ceiling 130) or to a door frame 148 of a doorway 158 in which the door 104 is mounted. A distal end 112 of the flexible member 114 is coupled to or in close proximity to the second side 110 of the door 104. The flexible member 114 extends from the second side 110 of the door 104 through a pulley or fairlead 116 to the generator 152. When the door 104 is opened as indicated by arrow 140, the flexible member 114 is pulled in a first direction as indicated by arrow 142 through the sweep of motion of the door 104, which in turn causes the generator 152 to rotate, thereby generating electricity.

The flexible member 114 allows the generator 152 to be positioned remote from (e.g., not mounted on) the door 104 and hinges 106. By mounting the pulley or fairlead 116 proximate a side 152 of the doorway 158 in which the door 104 is mounted way from the hinges 106, the flexible member 114 will be pulled a greater length being at or proximate to the maximum sweep 124 while still allowing the generator 152 to be mounted remote from the door 104. The flexible member 114 may be a cable, wire, rope, chain, belt, line or other suitable elongated item that allows the motion of the door to drive the generator through a pulley or fairlead 116.

The flexible member 114 is interfaced with an engagement device 150 that is coupled to an input shaft of the generator 152. The engagement device 150 is operable to provide an input rotation to the generator 152 when the flexible member 114 is pulled in a first direction as the door 104 opens as indicated by arrows 142 and 140, by converting the movement of the flexible member 114 into rotary motion of the generator 152.

In one embodiment, the engagement device 150 is configured to drive the rotation of the input shaft of the generator 152 as the force of the door opening is transferred to the engagement device 150 by the flexible member 114, while allowing the input shaft of the generator 152 to spin freely when the flexible member 114 moves in a direction opposite the first direction 142 or is motionless. For example, the engagement device 150 and input shaft of the generator 152 may be engaged using a ratchet mechanism that couples the motion of the engagement device 150 (i.e., spun by the flexible member 114) to the input shaft of the generator 152 only when the flexible member 114 is moved in one direction (e.g., the first direction 142). In another embodiment, the engagement device 150 includes a torsion spring which causes the flexible member 114 to be wound up and stored on the engagement device 150 when the flexible member 114 is moved in the second direction.

The generator 152 may also include a flywheel 154 interfaced with the input shaft or other portion of the generator 152. The flywheel 154 allows the generator 152 to continue turning and generating electricity during periods where the flexible member 114 is motionless and/or moved in the second direction. Thus, the flywheel 154 allows the generator 152 allows the generator 152 to more efficiently convert the force applied to the door 104 into electricity.

Figure 2:
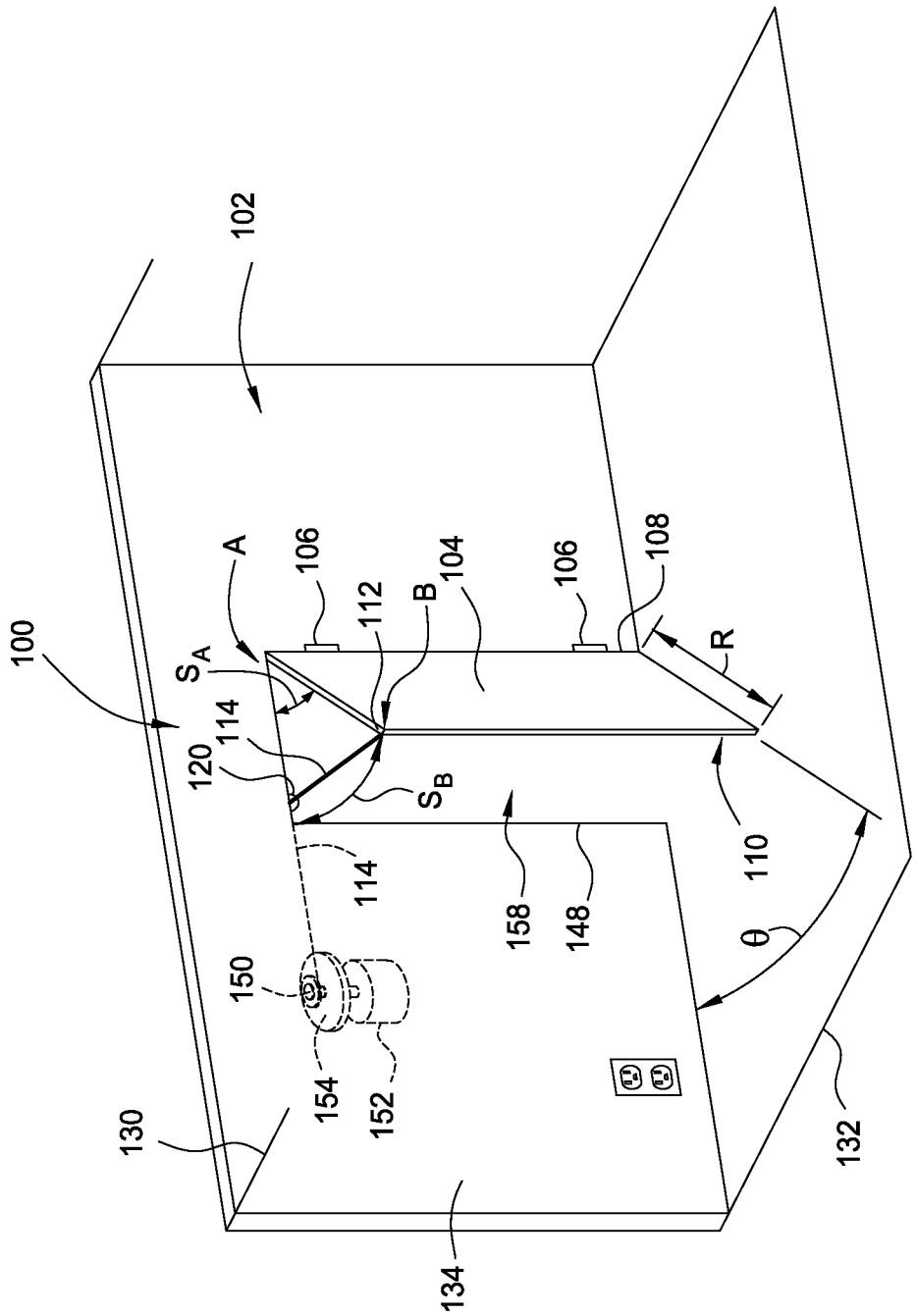
FIG. 2 is a perspective view of the entranceway or door assembly with the electricity generation system of FIG. 1 mounted to the doorway illustrating a sweep analysis.

FIG. 2 is a perspective view of the electricity generation system 100 of FIG. 1 mounted to the doorway 158 illustrating a sweep analysis. The door 104 mounted on hinges 106 an angle θ of sweep and a radius R of a virtual arc represented by the sweep of the door 104. The arc length of the sweep of motion proximate the second side 110 of the door 104 is represented by $S_B$, wherein $S_B=R_B(\theta)$, $R_B$ being the distance of the attachment point of the distal end of the flexible member 114 from the axis of the hinge 106. The arc length of the sweep of motion proximate the first side 108 of the door 104 is represented by $S_A$, wherein $S_A=R_A(\theta)$, $R_A$ being the distance from the axis of the hinge 106. With the angle of sweep at the hinge side of the door and opposite side of the door being equal, and the arc length at the hinge side $S_A$ is much less then the arc length $S_B$ on the second side 110 of the door 104 opposite the hinge 106. Since a larger sweep moves the flexible member 114 a longer distance in the first direction, coupling the flexible member 114 close to the second side 110 of the door 104 away from the hinge 106 will generate more electricity due to the longer and faster movement of the flexible member 114 at the engagement device 150.

Figure 3:
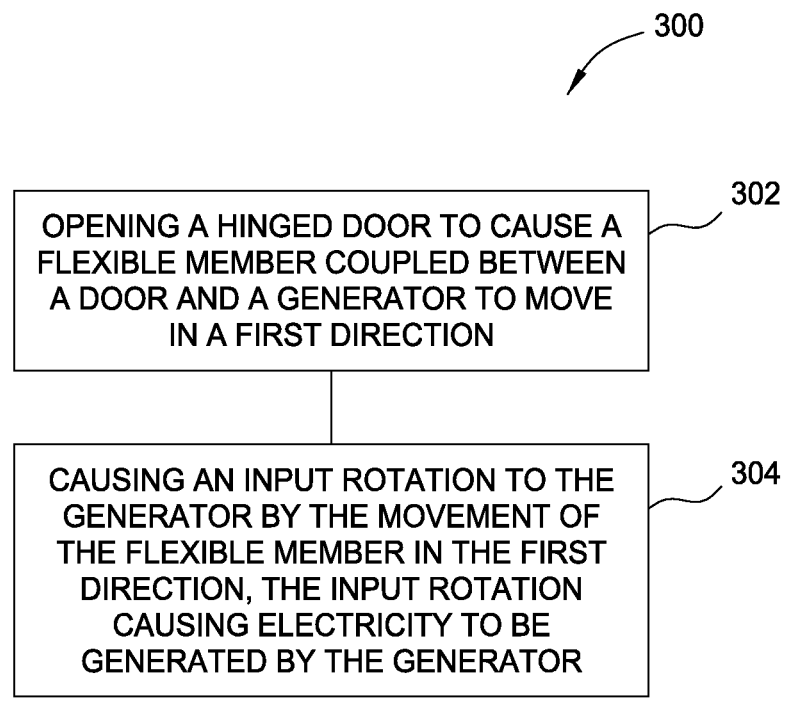
FIG. 3 is a flow chart of one embodiment of a method for generating electricity utilizing a motion of a hinged door.

FIG. 3 is a block diagram for a method 300 for generating electricity. The method begins at step 302 by opening a hinged door to cause a flexible member coupled between the door 104 and the generator 152 to move in a first direction. At step 304, an input rotation to the generator 152 is caused by movement of the flexible member 114 in the first direction 142, the input rotation causing electricity to be generated by the generator 152.

In one embodiment, the step 304 of causing the input rotation to the generator 152 may include spinning a flywheel.

In another embodiment, the method 300 may include moving the flexible member 114 in a second direction without proving a force opposite the input rotation. For example, the flexible member 114 may be wound on the engagement device 150 as the flexible member 114 moves in a second direction.

Figure 4:
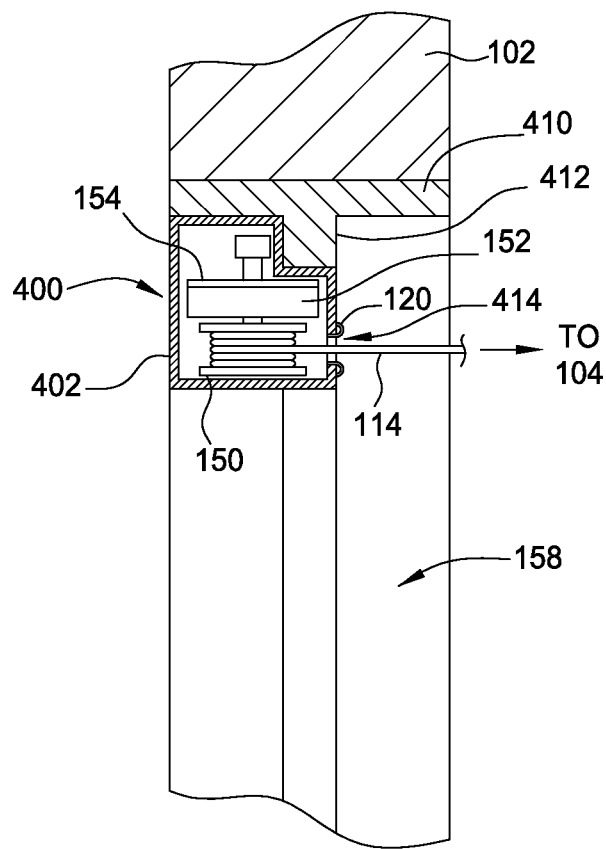
FIG. 4 is a partial sectional view of an entranceway or door assembly with one embodiment of an electricity generation system mounted to the doorway according to another embodiment of the invention.

FIG. 4 is a partial sectional view of an entranceway or doorway 158 with one embodiment of an electricity generation system 400 mounted to a frame 410 of the doorway 158 according to another embodiment of the invention. The electricity generation system 400 may be, at least in one mode of operation, operated according to the method 300 described above.

The electricity generation system 400 includes at least a flexible member 114, a generator 152 and an engagement device 150 disposed in a casing 402. In one embodiment, the generator 152 may be a pancake-type generator to more efficiently fit within the casing 402. The generator 152 may also include a flywheel 152 as discussed above.

The casing 402 facilitates mounting the electricity generation system 400 to the frame 410 of the doorway 158 as further described below. The casing 402 may be sized to not extend beyond the frame 410 of the doorway 158. The casing 402 includes an aperture 414 through which the flexible member 114 is routed. The aperture 414 may includes, or is configured as, a fairlead or pulley 120. Alternatively, the fairlead or pulley 120 may be mounted externally to the casing 402 or to the frame 410 of the doorway 158.

The engagement device 150 may be configured with a spring loaded or other retraction mechanism to enable the flexible member 114 to be retracted back onto the engagement device 150 after being displaced in the first direction by opening of the door 104.

The flexible member 114 may include a fitting 522 to facilitate coupling the flexible member 114 to the door 104. The fitting 522 may be a swaged aircraft eye fitting 550 so that the flexible member 114 maybe easily attached and detached from the door 104.

Figure 5:
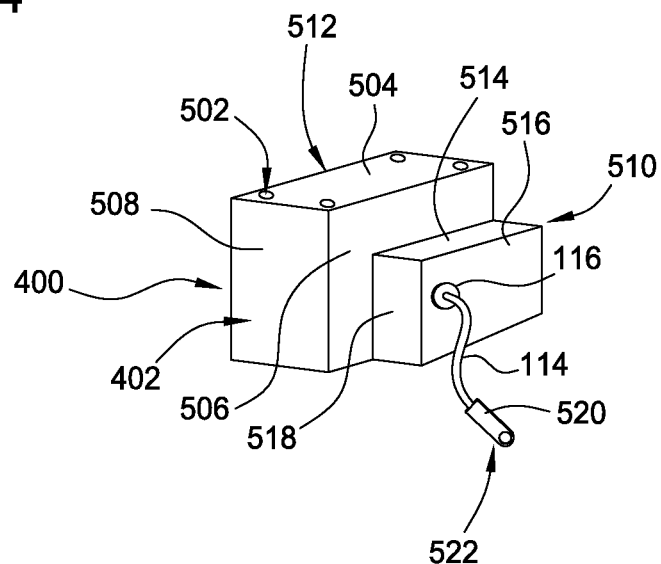
FIG. 5 is a perspective view of the electricity generation system of FIG. 4.

Referring additionally to the perspective view of the electricity generation system 400 illustrated in FIG. 5, the casing 402 of the electricity generation system 400 includes a plurality of mounting holes 502 to facilitate securing the casing 402 to the frame 410 of the doorway 158. The casing 402 also a cut-out along its length so that the casing may be installed flush with the door frame 410 despite the presence of a raised doorstop component 412 of the doorway 158. For example, the cut-out of the casing 402 may be defined between a main body 512 and a projecting region 510 of the casing 402. One or both of the main body 512 and the projecting region 510 may be rectangular. In one embodiment, the cut-out of the casing 402 may be defined between a top surface 504 and a front surface 506 of the main body 512 and a top surface 514 and a front surface 516 of the projecting region 510 which is configured to mate with the raised doorstop component 412 of the doorway 158. In another embodiment, the cut-out of the casing 402 may be defined between a side surface 508 and the front surface 506 of the main body 512 and a side surface 518 and the front surface 516 of the projecting region 510 which is configured to mate with the raised doorstop component 412 of the doorway 158.

Thus, a system for generating electricity by harnessing the energy dissipated by opening a door about its hinges is provided. The present invention supersedes the prior art in efficiency, functionality, applicability, and yield by applying a modular design with a flexible member that connects the door to the frame at the point of greatest sweep. The present invention thus captures the greatest amount of motion and converts that into high rpm revolutions in the generator. The advantage of the present invention is also that the generator retains momentum even after action upon the door has ceased, this means that even once a door is closed, the generator is still free to continue spinning, and thus generating electricity. The present design does not require any modifications to an existing doorway, it is not necessary to integrate it into the hinges of the doorway, or into the wall of the doorway. The device can be added to any entranceway that involves a door opening and closing on hinges, no modifications to the doorway are needed, the device can be simply mounted in an extremely short amount of time, and then the generated electricity can be integrated into the building.

I claim:

1. An energy generating system, comprising:
  a door;
  a plurality of hinges coupled to the door;
  a generator;
  a flexible member interfaced with the door and generator such that the flexible member is pulled away from the generator when the door is moved to an open position, the flexible member not coupled to the generator or hinge;
  a spring recoiling mechanism operable to coil the flexible member when the flexible member moves in a second direction; and
  an engagement device coupled to the generator and interfaced with the flexible member, the engagement device operable to provide an input rotation to the generator when the flexible member is pulled away from the generator in a first direction.

2. The energy generating system of claim 1, wherein the flexible member is a cable, wire, rope, chain, belt or line.

3. The energy generating system of claim 1, wherein the engagement device is operable to allow the flexible member to move in a second direction without interference with the operation of the generator.

4. The energy generating system of claim 1 further comprising:
  a casing housing the flexible member, the generator and the engagement device, wherein the flexible member extends through an aperture formed through the casing.

5. The energy generating system of claim 1, wherein an output of the generator is integrated into a structure.

6. An energy system, comprising:
  a door being of a kind that people walk through;
  a plurality of hinges coupled to the door;
  a generator having an output that is integrated into a structure;
  a flexible member having a first end coupled to the door, the first end coupled adjacent an edge of the door, and a second end interfaced with the generator such that the flexible member is pulled away from the generator when the door is swung to an open position, the flexible member not coupled to the generator or hinge, and wherein the flexible member is a cable, wire, rope, chain, belt or line; and
  an engagement device coupled to the generator and interfaced with the flexible member, the engagement device operable to provide an input rotation to the generator when the flexible member is pulled in a first direction.

7. The energy generating system of claim 6, wherein the engagement device is operable to allow the flexible member to move in a second direction without interference with the operation of the generator.

8. The energy generating system of claim 6, wherein the engagement device comprises:
  a spring recoiling mechanism operable to coil the flexible member when the flexible member moves in the second direction.

9. The energy generating system of claim 6 further comprising:
  a casing housing the flexible member, the generator and the engagement device, wherein the flexible member extends through an aperture formed through the casing.

10. The energy generating system of claim 6 wherein the generator is mounted to the structure.

11. The energy generating system of claim 6, wherein the generator is mounted within the structure.

12. The energy generating system of claim 6, wherein the structure is a wall or door frame.

13. The energy generating system of claim 6, wherein an angle of the flexible member relative to the structure changes with a sweep of the door as the flexible member is pulled in a first direction.

14. A method for generating energy, comprising:
  opening a hinged door coupled to a structure to cause a flexible member coupled between the door and a generator to move in a first direction, wherein the flexible member is a cable, wire, rope, chain, belt or line;
  causing an input rotation to the generator by movement of the flexible member in the first direction, the input rotation causing electricity to be generated by the generator;
  winding the flexible member around an engagement device when the flexible member is moved in a second direction; and
  integrating the generated electricity into the structure.

15. The method of claim 14 further comprising:
  moving the flexible member in the second direction without providing a force opposite the input rotation.

16. The method of claim 14 further comprising:
  guiding the flexible member through a pulley.

17. The method of claim 14, wherein causing the input rotation to the generator by movement of the flexible member in the first direction further comprises:
  pulling the flexible member from a casing housing the generator.

* * * * *